United States Patent
Xiao et al.

(10) Patent No.: US 10,367,264 B2
(45) Date of Patent: Jul. 30, 2019

(54) COMBINED PHASE SHIFTER AND MULTI-BAND ANTENNA NETWORK SYSTEM

(71) Applicant: HUAWEI TECHNOLOGIES CO., LTD., Shenzhen, Guangdong (CN)

(72) Inventors: Weihong Xiao, Shenzhen (CN); Xinming Liu, Xi'an (CN); Chunliang Xu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 15/820,921

(22) Filed: Nov. 22, 2017

(65) Prior Publication Data

US 2018/0108990 A1 Apr. 19, 2018

Related U.S. Application Data

(63) Continuation of application No. PCT/CN2015/080493, filed on Jun. 1, 2015.

(51) Int. Cl.
*H01Q 1/24* (2006.01)
*H01Q 3/36* (2006.01)
(Continued)

(52) U.S. Cl.
CPC ............... *H01Q 3/36* (2013.01); *H01P 1/18* (2013.01); *H01P 1/184* (2013.01); *H01Q 1/246* (2013.01);
(Continued)

(58) Field of Classification Search
CPC ........ H01Q 1/242; H01Q 1/243; H01Q 1/125; H01Q 1/1257; H01Q 21/24
(Continued)

(56) References Cited

U.S. PATENT DOCUMENTS 7,301,422 B2 11/2007 Zimmerman et al.
9,325,043 B2 * 4/2016 Katipally ................. H01Q 3/32
(Continued)

FOREIGN PATENT DOCUMENTS

CN 2838051 Y 11/2006
CN 101587989 A 11/2009
(Continued)

OTHER PUBLICATIONS

Extended European Search Reports issued in European Application No. 15893669.0 (PCT/CN2015080493) dated Apr. 25, 2018, 7 pages.
(Continued)

*Primary Examiner* — Joseph J Lauture
(74) *Attorney, Agent, or Firm* — Fish & Richardson P.C.

(57) ABSTRACT

The application discloses a combined phase shifter and a multi-band antenna network system. The combined phase shifter includes at least two phase shifters. The phase shifters have different frequency bands. Each phase shifter includes a signal line layer and components that are configured to change a phase of an output port of the signal line layer. The components are slidable relative to the signal layer. A filter circuit is provided at an output port of the signal layer. Output ports of filter circuits corresponding to the at least two phase shifters are connected by a conductor, and perform output using a common output port.

20 Claims, 6 Drawing Sheets

(51) Int. Cl.
  *H01P 1/18* (2006.01)
  *H01Q 5/371* (2015.01)
  *H01Q 3/32* (2006.01)
  *H01Q 1/12* (2006.01)

(52) U.S. Cl.
  CPC ............... *H01Q 3/32* (2013.01); *H01Q 5/371* (2015.01); *H01Q 1/125* (2013.01); *H01Q 1/1257* (2013.01); *H01Q 1/242* (2013.01); *H01Q 1/243* (2013.01)

(58) Field of Classification Search
  USPC .................................. 343/702, 757, 797, 904
  See application file for complete search history.

(56) References Cited

U.S. PATENT DOCUMENTS

| | | |
|---|---|---|
| 2008/0272672 A1 | 11/2008 | Higashionji et al. |
| 2009/0189826 A1 | 7/2009 | Timofeev et al. |
| 2013/0063225 A1 | 3/2013 | Deng et al. |
| 2013/0099877 A1 | 4/2013 | Abhaikumar et al. |

FOREIGN PATENT DOCUMENTS

| | | |
|---|---|---|
| CN | 101645524 A | 2/2010 |
| CN | 101694897 A | 4/2010 |
| CN | 202523820 U | 11/2012 |
| CN | 202839907 U | 3/2013 |
| CN | 203180015 U | 9/2013 |
| CN | 103474724 A | 12/2013 |
| CN | 204348871 U | 5/2015 |
| EP | 3092677 A1 | 11/2016 |
| JP | 2001196804 A | 7/2001 |
| KR | 101415540 B1 | 7/2014 |
| WO | 2014121754 A1 | 8/2014 |
| WO | 2015013063 A1 | 1/2015 |
| WO | 2015105568 A1 | 7/2015 |

OTHER PUBLICATIONS

International Search Report in International Application No. PCT/CN2015/080493, dated Mar. 4, 2016, 6 pages.
Chinese Office Action issued in Chinese Application No. 201580072395.9 dated Apr. 28, 2019, 6 pages.

* cited by examiner

COMBINED PHASE SHIFTER AND MULTI-BAND ANTENNA NETWORK SYSTEM

CROSS-REFERENCE TO RELATED APPLICATIONS

This application is a continuation of International Application No. PCT/CN2015/080493, filed on Jun. 1, 2015, the disclosure of which is hereby incorporated by reference in its entirety.

TECHNICAL FIELD

The present disclosure relates to the field of communications technologies, and in particular, to a combined phase shifter and a multi-band antenna network system.

BACKGROUND

A phase shifter is a core component of a base station antenna. A phase shifter that is developed currently not only can adjust a phase but also can adjust an amplitude. In this way, the phase shifter can adjust a pointing direction of a radiation pattern formed in space by the base station antenna, so as to flexibly adjust coverage of different user regions. Performance of the phase shifter not only affects indicators such as gain, a pattern, and isolation of the antenna, but also affects a size and costs of the antenna.

Solution in the prior art: high-frequency cavity phase shifter:

FIG. 1 shows a cavity phase shifter. The cavity phase shifter includes a housing 1, a cavity disposed inside the housing 1, a substrate 3 located inside the cavity, a conductor 4 disposed on the substrate 3, and movable dielectrics 2 disposed on two sides of the substrate 3.

A movable dielectric or air may be used as a substrate of the shown conductor 4. The shown movable dielectrics 2 include an upper part and a lower part. The conductor 4 is fastened in the movable dielectric 2. The movable dielectric 2 freely slides in a cable layout direction of the conductor 4, to change a location at which the movable dielectric covers the conductor 4 and an area that the movable dielectric covers on the conductor 4. In this way, a dielectric constant of a propagating signal is affected. That is, a phase of an output signal is changed, so as to perform phase shifting.

FIG. 2 is a connection diagram of a conventional multi-band antenna network (Note: CMB represents a combiner). Phase shifters and combiners are separately designed, resulting a large quantity of cables and a complex layout. As more frequency bands are integrated by a single-sided base station antenna, it is increasingly difficult for such a network connection to meet a requirement.

SUMMARY

The present disclosure provides a combined phase shifter and a multi-band antenna network system, so as to reduce cables in the multi-band antenna network system and make it convenient to dispose the multi-band antenna network system.

According to a first aspect, a combined phase shifter is provided, including at least two laminated phase shifters, where different phase shifters have different frequency bands, each phase shifter includes a signal layer and components that are slidable relative to the signal layer and that are configured to change a phase of an output port of the signal layer, and a filter circuit is provided at the output port of the signal layer; and output ports of filter circuits corresponding to the at least two phase shifters are connected by using a conductor, and perform output by using a common output port.

With reference to the first aspect, in a first possible implementation, a signal line layer includes an input port, a power splitter connected to the input port, a first output port connected to the power splitter, and two signal transmission lines, at least one branch transmission line is connected to each signal transmission line, a filter circuit is connected to each branch transmission line, and the output port is connected to the filter circuit.

With reference to the first possible implementation of the first aspect, in a second possible implementation, the common output port has a U-shaped snap ring or through-hole structure, and the conductor is clasped in the U-shaped snap ring or through-hole structure to implement signal connection.

With reference to the first possible implementation of the first aspect, in a third possible implementation, the two signal transmission lines are symmetrically distributed on two sides of the power splitter.

With reference to the first aspect, the first possible implementation of the first aspect, the second possible implementation of the first aspect, or the third possible implementation of the first aspect, in a fourth possible implementation, the phase shifter is a physical phase shifter, the component is a swing arm, and the signal layer of the phase shifter is attached on a substrate.

With reference to the fourth possible implementation of the first aspect, in a fifth possible implementation, a quantity of the phase shifters is two, and the signal layers of the two phase shifters are respectively attached on two opposite faces of the substrate.

With reference to the first aspect, the first possible implementation of the first aspect, the second possible implementation of the first aspect, or the third possible implementation of the first aspect, in a sixth possible implementation, the combined phase shifter further includes a housing, where a cavity corresponding to each phase shifter is disposed inside the housing, and a substrate configured to carry the signal layer of the phase shifter inside each cavity is disposed inside the cavity.

With reference to the sixth possible implementation of the first aspect, in a seventh possible implementation, the substrate is a substrate made of plastic or ceramic.

With reference to the sixth possible implementation of the first aspect, in an eighth possible implementation, the common output port is connected to an output port of a filter circuit of one of the at least two phase shifters.

With reference to the eighth possible implementation of the first aspect, in a ninth possible implementation, a partition board is disposed between neighboring cavities, and a through-hole through which the conductor is disposed is provided at the partition board.

With reference to the ninth possible implementation of the first aspect, in a tenth possible implementation, a slot configured to clasp the phase shifter is disposed inside each cavity.

According to a second aspect, a multi-band antenna network system is provided, where the multi-band antenna network system includes the combined phase shifter according to any one of the foregoing implementations.

According to the combined phase shifter provided in the first aspect and the multi-band antenna network system provided in the second aspect, output ports of two phase shifters having different frequencies are integrated by using a conductor to perform output. Moreover, the combined phase shifter provided in this embodiment does not need an additional combiner. In comparison with the prior art, a quantity of used devices is reduced, and a quantity of cables used in a multi-band antenna network system is also reduced. This facilitates a layout, thereby making it convenient to dispose the multi-band antenna network system. In addition, this facilitates a layout of an entire machine, reduces a weight of the entire machine, and reduces costs. In addition, the combined phase shifter provided in this embodiment of the present disclosure may also increase antenna gain, and optimize pattern parameters.

REFERENCE NUMERALS

Figure 1:
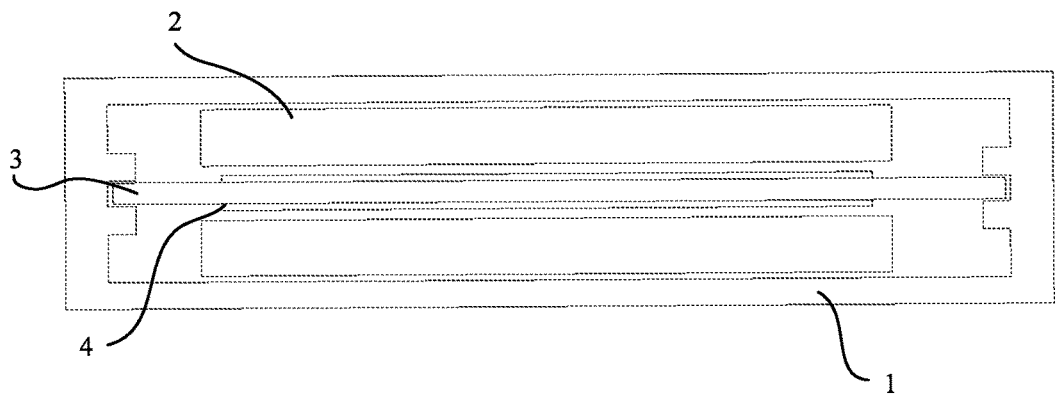
FIG. 1 is a cutaway drawing of a combined phase shifter in the prior art.
Figure 2:
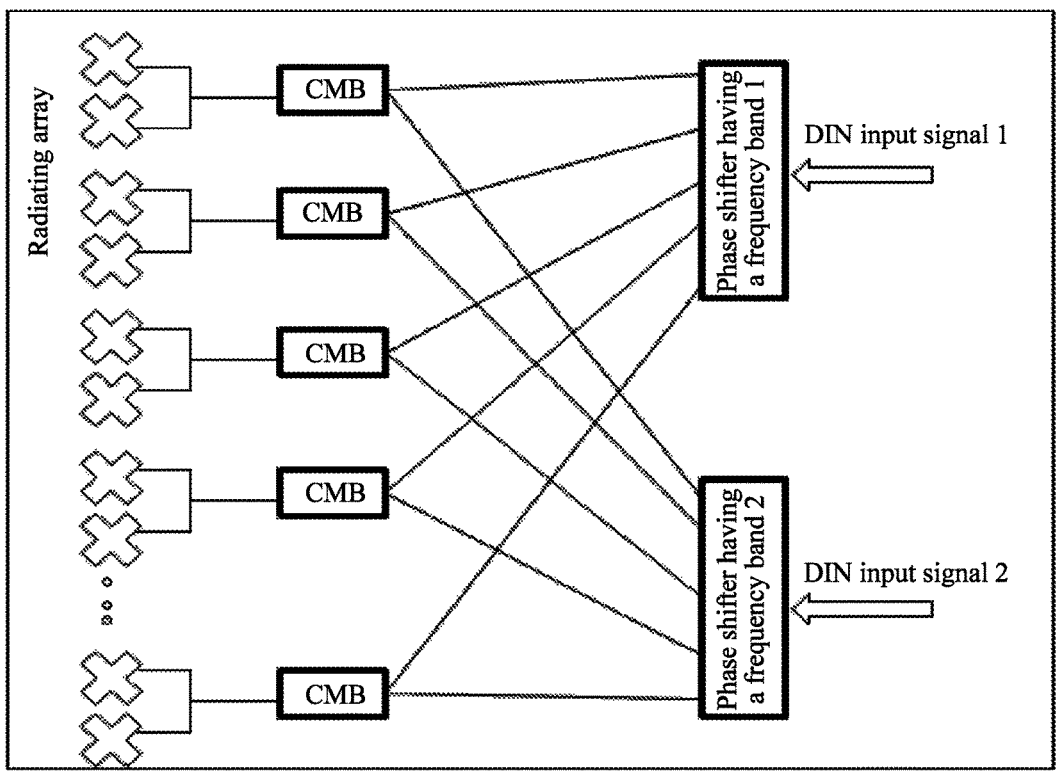
FIG. 2 is a system diagram of a multi-band antenna network system in the prior art.

1: Housing; 2: movable dielectric; 3: Substrate
4: Conductor; 10: Housing; 11: First cavity
12: Second cavity; 20: First signal line layer; 20$a$1: Input port
20$a$2: Power splitter; 20$a$3 and 20$a$5: Signal transmission lines; 20$a$4, 20$a$6, 20$a$7, and 20$a$8: Branch signal transmission lines
20$b$1 and 20$b$2: Filter circuits
21: Second signal line layer; 21$a$2: Power splitter; 21$a$3 and 21$a$5: Signal transmission lines
21$a$4, 21$a$6, 21$a$7, and 21$a$8: Branch signal transmission lines; 21$b$1 and 21$b$2: Filter circuits
30: First substrate; 31: Second substrate; 40: First dielectric layers
41: Second dielectric layers; 50 and 51: Conductors; 60, 61, and 66: Common output ports
62 and 63: First output ports; 64 and 65: Output ports
70: Input port; 70_$b$1: Power splitter; 70_$b$2, 70_$b$3, and 70_$b$4: Transmission lines
70_$b$6: Coupling rectangular sheet; 70_$a$1, 70_$a$2, 70_$a$3, 70_$a$4, and 70_$a$5: Output ports
71: Input port; 71_$a$1, 71_$a$2, 71_$a$3, 71_$a$4, and 71_$a$5: Output ports
72 and 73: Swing arms; 74: Arc-shaped line; 75: Rotating shaft
80: Substrate; 81: Metal ground; 90: Conductor
91, 92, 93, and 94: Stubs having a filtering function

DESCRIPTION OF EMBODIMENTS

The following describes the specific embodiments of the present disclosure in detail with reference to the accompanying drawings. It should be understood that the specific embodiments described herein are merely used to describe and explain the present disclosure, but are not intended to limit the present disclosure.

An embodiment of the present disclosure provides a combined phase shifter. The combined phase shifter includes at least two laminated phase shifters, and different phase shifters have different frequency bands. Each phase shifter includes a signal layer and components that are slidable relative to the signal layer and configured to change a phase of an output port of the signal layer, and a filter circuit is provided at the output port of the signal layer.

Output ports of filter circuits corresponding to the at least two phase shifters are connected by using a conductor, and perform output by using a common output port.

In the foregoing embodiment, output ports of two phase shifters having different frequencies are integrated by using a conductor to perform output. Moreover, the combined phase shifter provided in this embodiment does not need an additional combiner. In comparison with the prior art, a quantity of used devices is reduced, and a quantity of cables used in a multi-band antenna network system is also reduced. This facilitates a layout, thereby making it convenient to dispose the multi-band antenna network system. In addition, this facilitates a layout of an entire machine, reduces a weight of the entire machine, and reduces costs. In addition, the combined phase shifter provided in this embodiment of the present disclosure may also increase antenna gain, and optimize pattern parameters.

To help understand a structure of the combined phase shifter provided in this embodiment, the following describes the structure of the combined phase shifter provided in this embodiment in detail with reference to the accompanying drawings.

To facilitate description of the combined phase shifter provided in this embodiment, the following provides a description by using a specific embodiment. The combined phase shifter further includes a housing, a cavity corresponding to each phase shifter is disposed inside the housing, and a substrate configured to carry the signal layer of the phase shifter inside each cavity is disposed inside the cavity.

The following provides a description by using an example in which a housing has two cavities, a phase shifter is disposed inside each cavity, and the two phase shifters have different frequencies.

Figure 3:
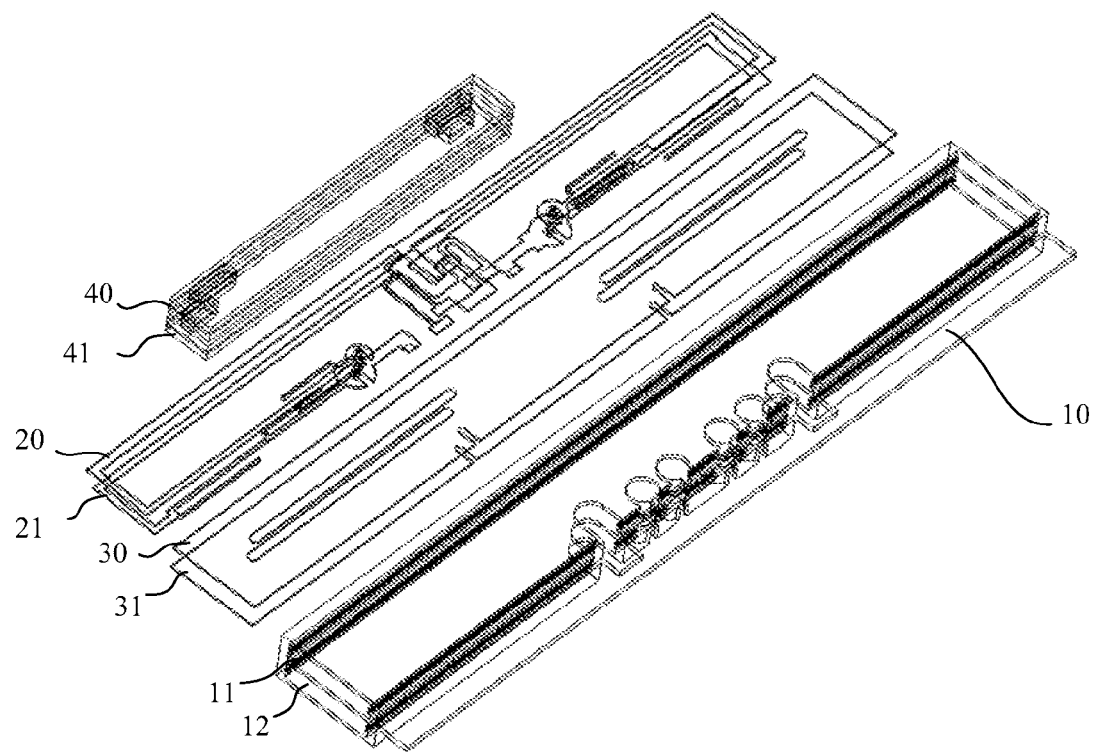
FIG. 3 is a schematic exploded view of a combined phase shifter according to an embodiment of the present disclosure.
Figure 4:
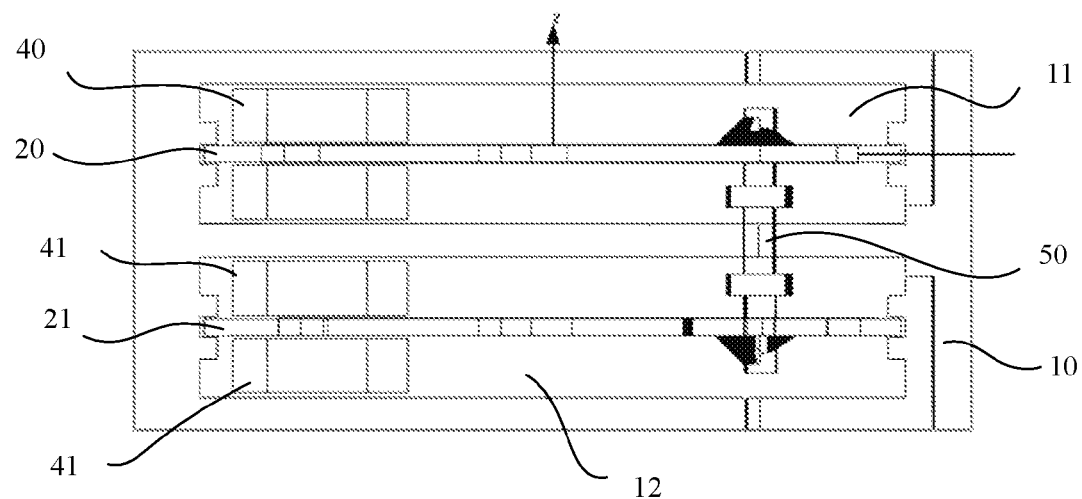
FIG. 4 is a sectional view of a combined phase shifter according to an embodiment of the present disclosure.

Referring to FIG. 3 and FIG. 4 together, as shown in FIG. 3 and FIG. 4, FIG. 3 is a schematic exploded view of the combined phase shifter according to this embodiment, and FIG. 4 is a sectional view of the combined phase shifter according to this embodiment.

In this embodiment, a partition board is disposed between neighboring cavities inside the housing 10, and a through-hole through which the conductor is disposed is provided at the partition board. That is, a cavity inside the housing 10 is divided by the partition board into a first cavity 11 and a second cavity 12, and a first phase shifter and a second phase shifter are respectively disposed inside the first cavity 11 and the second cavity 12.

The first phase shifter and the second phase shifter each include: a signal line layer disposed on a substrate and dielectric layers that are symmetrically disposed on two sides of the signal line layers and are slidable relative to the signal line layer (that is, components configured to change a phase of the output port of the signal layer in this embodiment). During specific disposition, the substrates and the signal line layers may be manufactured in a form of a printed circuit, that is, signal lines are printed on the substrates to form printed circuit boards, or substrates that are made of plastic or ceramic may be used. The signal line layers may be formed on the substrates in another manner of manufacturing a circuit.

As shown in FIG. 4, the first phase shifter includes a first substrate 30, a first signal line layer 20 disposed on the first substrate 30, and first dielectric layers 40 symmetrically disposed on two sides of the first signal line layer 20. When the first signal line layer 20 is disposed on the first substrate 30, the first dielectric layers 40 are symmetrically disposed on two sides of the first substrate 30. Similarly, the second phase shifter includes a second substrate 31, a second signal line layer 21 disposed on the second substrate 31, and second dielectric layers 41 symmetrically disposed on two sides of the second signal line layer 21. When the second signal line layer 21 is disposed on the second substrate 31, the second dielectric layers 41 are symmetrically disposed on two sides of the second substrate 31. In addition, the first signal line layer 20 and the second signal line layer 21 have output ports that are correspondingly disposed, and the correspondingly disposed output ports are connected by using a conductor, so that signals from the two phase shifters having different frequencies are integrated and then sent.

During specific disposition, a slot configured to clasp a phase shifter is disposed inside each cavity. That is, slots are respectively disposed on side walls of the first cavity 11 and the second cavity 12, and the two slots are respectively used to fasten the first substrate 30 of the first phase shifter and the second substrate 31 of the second phase shifter, so that the first phase shifter and the second phase shifter may be stably disposed inside the first cavity 11 and the second cavity 12.

The signal line layer includes an input port, a power splitter connected to the input port, a first output port connected to the power splitter, and two signal transmission lines. At least one branch transmission line is connected to each signal transmission line, a filter circuit is connected to each branch transmission line, and an output port is connected to the filter circuit. That is, the output port of the signal line layer is connected to the power splitter by using the filter circuit and a connection cable. In addition, during actual disposition, a quantity of the output ports may be set according to a requirement. That is, different output ports may be disposed by disposing different branch transmission lines and by using correspondingly disposed filters. In the structure, an output port of a filter circuit of one of the multiple phase shifters is connected to the common output port.

Figure 5:
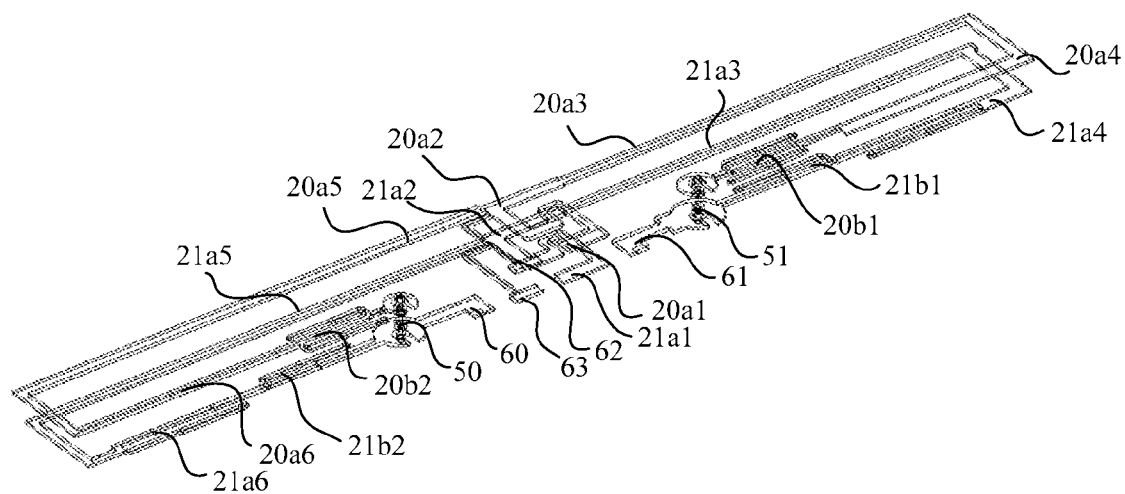
FIG. 5 is a schematic structural diagram of a signal line layer of a combined phase shifter according to an embodiment of the present disclosure.
Figure 6:
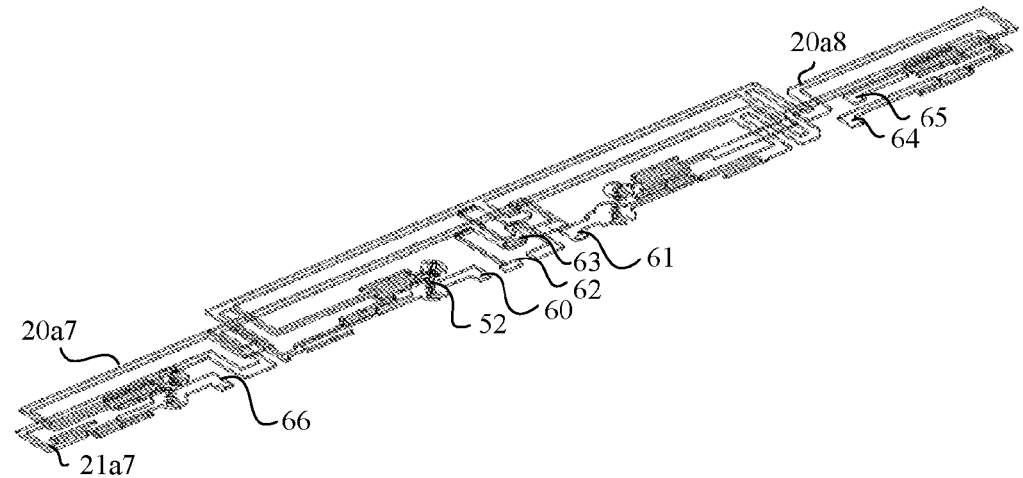
FIG. 6 is a schematic structural diagram of another signal line layer according to an embodiment of the present disclosure.

To help understand the signal line layer provided in this embodiment, the following describes the signal line layer provided in this embodiment with reference to FIG. 5 and FIG. 6.

As shown in FIG. 5, FIG. 5 shows a structure of two signal line layers when the signal line layers are used. During specific use, a phase shift principle of the phase shifter in the present disclosure is the same as that of a phase shifter in the prior art. As shown in FIG. 5, for the first signal line layer 20 of the first phase shifter, after a signal is input from an input port 20a1, the signal is divided by using a power splitter 20a2 into three signals. One signal is transmitted to a signal transmission line 20a3. Another signal is transmitted to a signal transmission line 20a5. The remaining signal is transmitted to a first output port 62, and the signal is output by using a connection cable of the first output port 62. The signal is transmitted along the signal transmission line 20a3 to a branch signal transmission line 20a4, is then transmitted to a filter circuit 20b1, where the filter circuit 20b1 has a filtering function, is then transmitted to a conductor 51 disposed at the output port, and is output by using a common output port 61. The signal is propagated along the signal transmission line 20a5 to a branch signal transmission line 20a6, and is transmitted to a filter circuit 20b2 through the branch signal transmission line 20a6. Similarly, the filter circuit 20b2 also has a filtering function. Next, the signal is transmitted through the filter circuit 20b2 to a conductor 50 disposed at the output port, the signal is propagated to a common output port 60 by using the conductor 50, and the signal is output by using the common output port 60. Similarly, another signal having a different frequency band is input from an input port 21a1, and is divided by using a power splitter 21a2 into three signals. One signal is transmitted to a signal transmission line 21a3. Another signal is transmitted to a signal transmission line 21a5. The remaining signal is transmitted to a first output port 63, and the signal is output by using a connection cable of the first output port 63. The signal is transmitted along the signal transmission line 21a3 to a signal transmission line 21a4, is transmitted along the signal transmission line 21a4 to a filter circuit 21b1 having a filtering function, and is then transmitted through the filter circuit 21b1 to the common output port 61. The signal is transmitted along the signal transmission line 21a5 to a signal transmission line 21a6, is transmitted through the signal transmission line 21a6 to a filter circuit 21b2 having a filtering function, and is eventually output by using the common output port 60. The foregoing output ports (60, 61, 62, and 63) are connected to an antenna radiating element.

The conductors 50 and 51 have a function of connecting output ports of phase shifters having different frequency bands, and can conduct a signal. The filter circuit 20b1, the filter circuit 21b1, and the conductor 51 form a combiner. The filter circuit 20b2, the filter circuit 21b2, and the conductor 50 form a combiner.

When dielectric layers are disposed, two sides of each signal transmission line correspond to a pair of dielectric layers that slide relative to the signal line layer. Specifically, the first dielectric layers 40 are distributed on two sides of the signal line 20, and may slide along the signal lines 20a3 and 20a5, so as to change phases of signals on 20a3 and 20a5. Similarly, the second dielectric layers 41 are distributed on two sides of the signal line 21, and may slide along the signal lines 21a3 and 21a5, so as to change phases of signals on 21a3 and 21a5.

In this embodiment, one signal transmission line corresponds to one branch signal transmission line, and formed output ports are the first output ports 62 and 63 and the common output ports 60 and 61.

As shown in FIG. 6, FIG. 6 shows a structure of another signal line layer. FIG. 6 is a schematic structural diagram of a structure using two branch signal transmission lines.

In the signal line layer shown in FIG. 6, each signal transmission line corresponds to two branch signal output lines. In a first signal line layer 20, a signal transmission line 20a5 corresponds to two branch signal transmission lines 20a6 and 20a7, each branch signal transmission line corresponds to one filter circuit, and each filter circuit corresponds to one output port. A signal transmission line 20a3 corresponds to two branch signal transmission lines 20a4 and 20a8, each branch signal transmission line corresponds to one filter circuit, and each filter circuit corresponds to one output port. In a second signal line layer 21, a signal transmission line 21a5 corresponds to two branch signal transmission lines 21a6 and 21a7, each branch signal transmission line corresponds to a filter circuit, and each filter circuit corresponds to one output port. A signal transmission line 21a3 corresponds to two branch signal transmission lines 21a4 and 21a8, each branch signal transmission line corresponds to one filter circuit, and each filter circuit corresponds to one output port. Specifically, during connection, output ports corresponding to the branch signal transmission lines 20a6 and 21a6 are connected by using a conductor 50, and perform output by using a common output port 60. Output ports corresponding to the branch signal transmission lines 20a7 and 21a7 are connected by using a conductor 52, and perform output by using a common output port 66. Output ports corresponding to the branch signal transmission lines 20a4 and 21a4 are connected by using a conductor 51, and perform output by using a common output port 61. In addition, for the branch signal transmission lines 20a8 and 21a8, an output port 65 connected to the branch signal transmission line 20a8 and an output port 64 connected to the branch signal transmission line 21a8 are not connected by using a conductor (alternatively, the output port 65 and the output port 64 may be connected by using a conductor, and perform output by using a same output port). Therefore, a combined phase shifter that is formed by using the signal line layer shown in FIG. 6 has six output ports (60, 61, 62, 63, 64, 65, and 66).

It should be understood that, FIG. 5 and FIG. 6 show merely two specific structures of the signal line layer provided in this embodiment. The signal line layer provided in this embodiment is not limited to the specific structures shown in FIG. 5 and FIG. 6, and another variation may also be used in this embodiment.

When a conductor is connected to a signal line layer, specifically, a common output port has a U-shaped snap ring or through-hole structure. The conductor is clasped in the U-shaped snap ring or through-hole structure to implement signaling connection. When the conductor is specifically mounted, the conductor is directly clasped in the U-shaped snap ring or through-hole structure. The conductor may be easily connected to two signal line layers by using the foregoing structure.

In addition, for distribution of the signal line layers, two signal transmission lines are symmetrically distributed on two sides of the power splitter. That is, the signal transmission lines are disposed by using a symmetric structure. Preferably, branch signal transmission lines may also be symmetrically disposed, so as to make it convenient to dispose the signal transmission lines and the branch signal transmission lines, thereby avoiding interaction between the lines, and improving overall appearance of the signal line layers.

The combined phase shifter provided in the embodiments of the present disclosure is not limited to the structure having two layers of phase shifters in the foregoing specific embodiment. Three, four or more different layers of phase shifters may be disposed inside the cavity of the housing 10, and a principle of such a structure is similar to that of the structure of the combined phase shifter discussed in the specific embodiment, and details are not described herein again.

In addition, the phase shifter provided in this embodiment is not limited to a dielectric phase shifter that is specifically described in the above, or may be a phase shifter using another principle. For example, the phase shifter is a physical phase shifter, the component is a swing arm, and a signal layer of the phase shifter is attached on a substrate.

Figure 7:
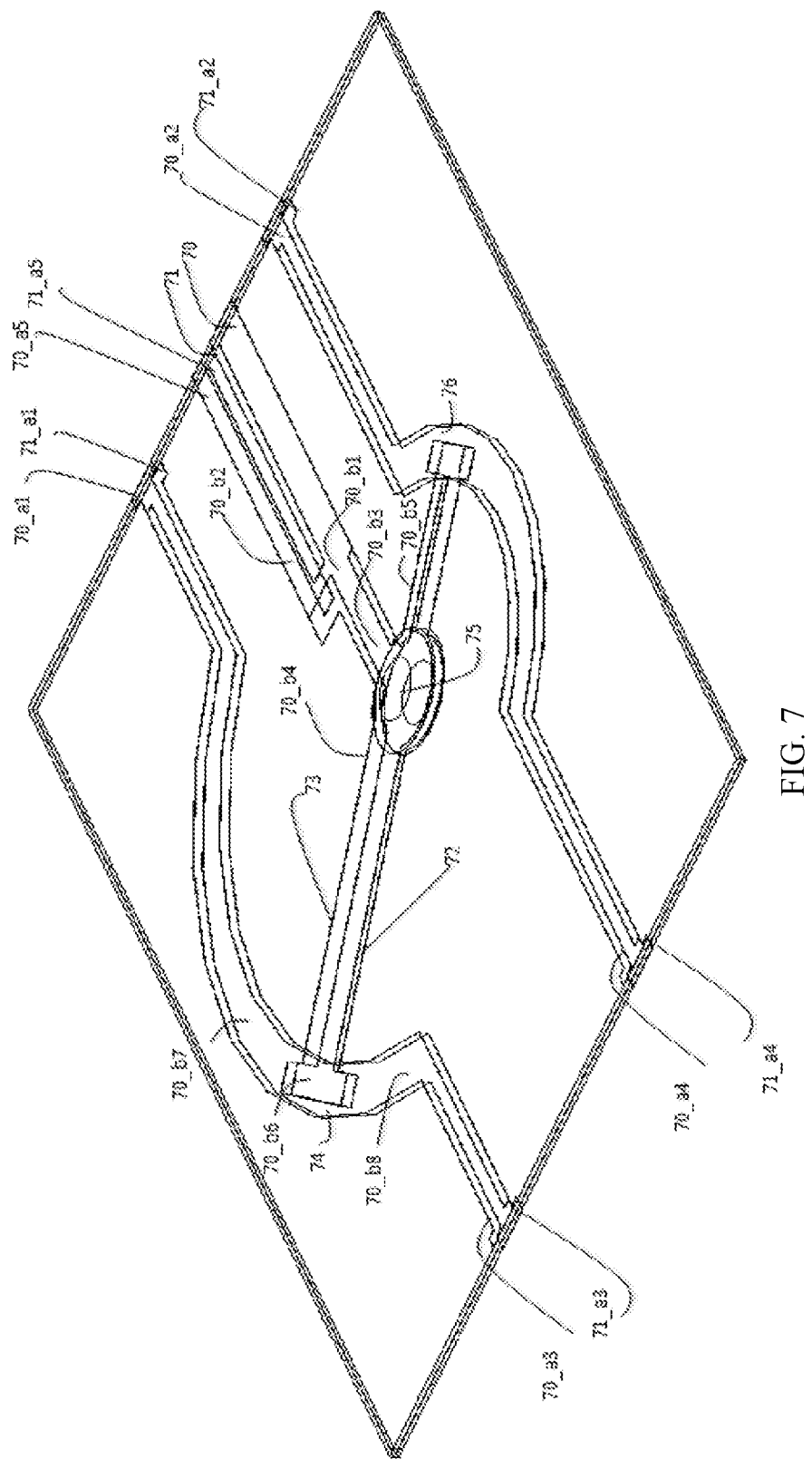
FIG. 7 is a schematic structural diagram of another combined phase shifter according to an embodiment of the present disclosure.
Figure 8:
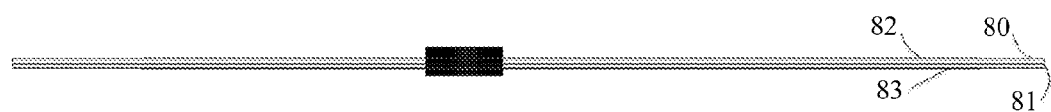
FIG. 8 is a side view of another combined phase shifter according to an embodiment of the present disclosure.
Figure 9:
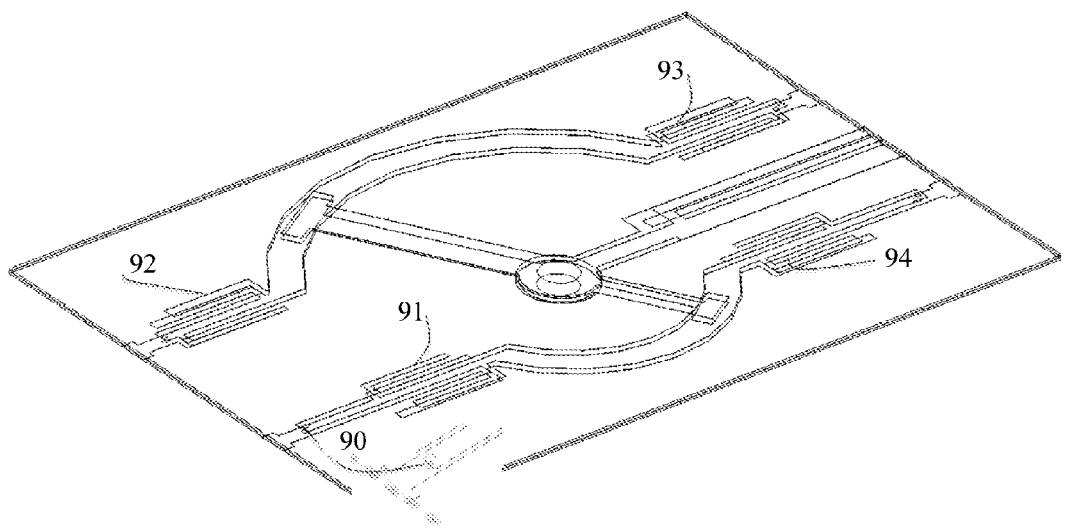
FIG. 9 is a schematic structural diagram of another combined phase shifter according to an embodiment of the present disclosure.

A specific structure is shown in FIG. 7, FIG. 8, and FIG. 9. In this embodiment, two phase shifters are used as an example. In this case, a quantity of the phase shifters is two, and signal layers of the two phase shifters are respectively attached on two opposite faces of the substrate.

Specifically, as shown in FIG. 7, FIG. 8, and FIG. 9, FIG. 7, FIG. 8, and FIG. 9 show a physical phase shifter in the prior art. Signal lines 82, 83 are attached on two sides of a substrate 80 (82 and 83 are signal lines of two phase shifters on two sides of the substrate), and there is a metal ground (also referred to as a reference plane) 81 in the middle of the substrate 80, forming a microstrip. The following describes an operating principle of the phase shifter.

A signal is input from an input port 70, is transmitted to a power splitter 70_b1, and is divided into two signals. One signal is transmitted through a transmission line 70_b2 and is output by using an output port 70_a5. The other signal is transmitted through a transmission line 70_b3, is coupled and is transmitted to a swing arm 73, and is transmitted in two directions 70_b4 and 70_b5 of the swing arm 73. The signal is transmitted to a coupling rectangular sheet 70_b6 through a transmission line 70_b4, is then coupled and transmitted to an arc-shaped line 74 by using 70_b6, is transmitted in two directions 70_b7 and 70_b8 of the arc-shaped line 74, and is separately output by using output ports 70_a1 and 70_a2. In addition, the swing arm (the component configured to change a phase of an output port of a signal layer in this embodiment) may swing in a transmission direction of the arc-shaped line 74 about a rotating shaft 75 that is used as an axis. In this way, a position of the coupling rectangular sheet 70_b6 on the arc-shaped line 74 changes. Distances for a signal to be transmitted to the output ports 70_a1 and 70_a3 change, thereby changing the phase, so as to achieve a phase shift function. Similarly, when a signal is transmitted along 70_b5 of the swing arm, the signal is transmitted to the arc-shaped line 76, and is transmitted to the output ports 70_a2 and 70_a4 by using 76. Similarly, the phase of the output port is also changed by swinging the swing arm. The above describes the operating principle of the phase shifter in this solution. An operating principle of a signal line 83 that is of the phase shifter and on another side of the substrate 80 is the same as the foregoing principle. That is, a signal is input from an input port 71, and is output by using 71_a1, 71_a2, 71_a3, 71_a4, and 71_a5. The phase of the output port is changed by swinging a swing arm 72, so as to achieve a phase shift function. Details are not described again. When the signal lines 82 and 83 of the combined phase shifter are attached on the substrate 80, during specific disposition, the substrate and the signal line layers may be manufactured in a form of a printed circuit, that is, signal lines are printed on the substrates to form printed circuit boards, or substrates that are made of plastic or ceramic may be used. The signal layers may be formed on the substrate by using another manner of manufacturing a circuit, or the signal lines are implemented by using a metal plate without using a substrate.

Similarly, as shown in FIG. 9, output ports are integrated with stubs 91, 92, 93, and 94 (that is, filter circuits) having a filtering function, are connected by using a conductor (for example, 90) to form one path, and perform output by using a same output port, forming a combined phase shifter. Input signals of upper and lower layers of a substrate have different frequencies.

It may be learned from the foregoing description that, a phase shift principle of the combined phase shifter provided in this embodiment may be the dielectric phase shifter having the cavity structure in the embodiments, or may be a phase shifter in another implementation form, for example, the physical phase shifter in the embodiments. That is, the combined phase shifter may be in any implementation form that may change a phase of an output port.

Figure 10:
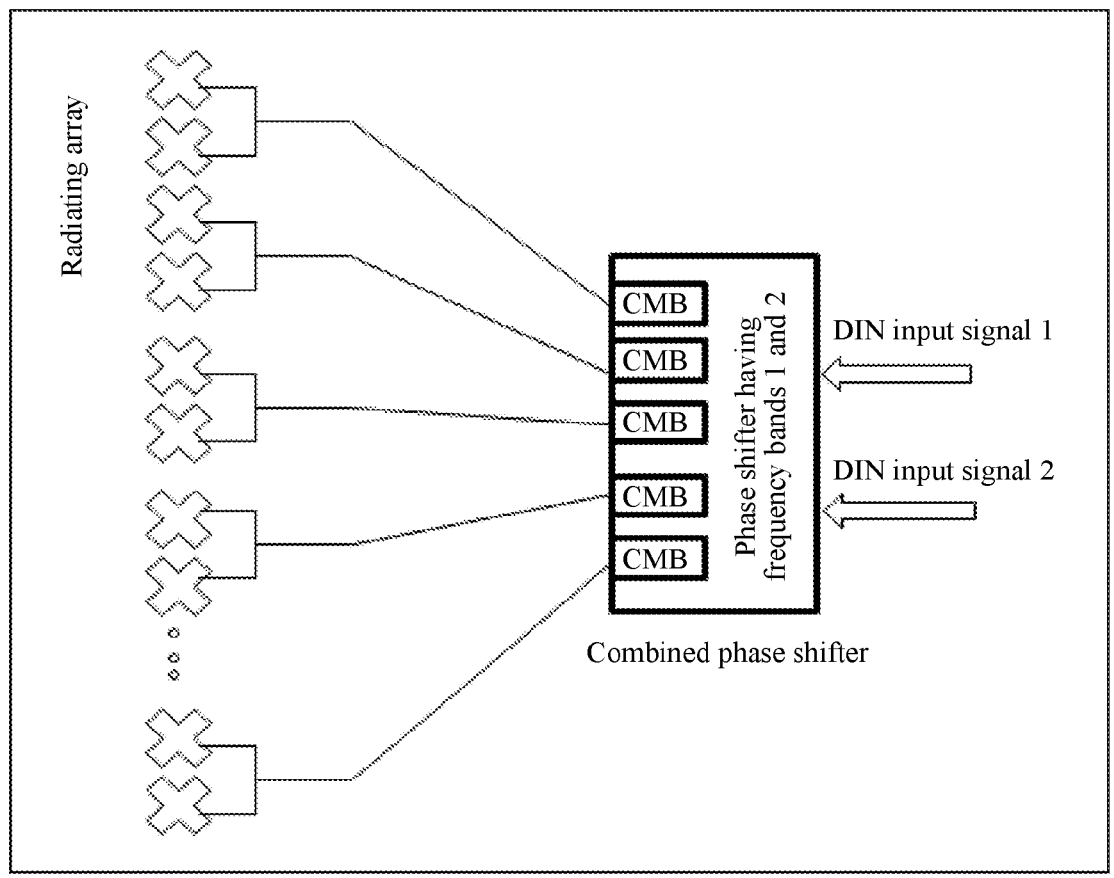
FIG. 10 is a system diagram of a multi-band antenna network system according to an embodiment of the present disclosure.

As shown in FIG. 10, an embodiment of the present disclosure further provides a multi-band antenna network system. The multi-band antenna network system includes the combined phase shifter according to any one of the embodiments.

In the foregoing embodiment, output ports of two phase shifters having different frequencies are integrated by using a conductor to perform output. Moreover, the combined phase shifter provided in this embodiment does not need an additional combiner. In comparison with the prior art, a quantity of used devices is reduced, and a quantity of cables used in a multi-band antenna network system is also reduced. This facilitates a layout, thereby making it convenient to dispose the multi-band antenna network system. In addition, this facilitates a layout of an entire machine, reduces a weight of the entire machine, and reduces costs. In addition, the combined phase shifter provided in this embodiment of the present disclosure may also increase antenna gain, and optimize pattern parameters.

Obviously, a person skilled in the art can make various modifications and variations to the present disclosure without departing from the spirit and scope of the present disclosure. The present disclosure is intended to cover these modifications and variations provided that they fall within the protection scope defined by the following claims and their equivalent technologies.

What is claimed is:

1. A combined phase shifter, comprising:
    at least two phase shifters, wherein the at least two phase shifters have different frequency bands, and each phase shifter comprises:
        a signal line layer;
        a phase changing component configured to change a phase of an output port of the signal line layer, wherein the phase changing component is slidable relative to the signal line layer; and
        a filter circuit provided at the output port of the signal layer; and
    output ports of filter circuits corresponding to the at least two phase shifters, wherein the output ports of filter circuits are connected by a conductor, and provide output using a common output port.

2. The combined phase shifter according to claim 1, wherein the signal line layer comprises:
    an input port;
    a power splitter connected to the input port;
    a first output port connected to the power splitter;
    two signal transmission lines;
    at least one branch transmission line that is connected to each of the two signal transmission lines; and
    a filter circuit that is connected to the at least one branch transmission line.

3. The combined phase shifter according to claim 2, wherein the common output port has a U-shaped snap ring or through-hole structure, and the conductor is clasped in the U-shaped snap ring or through-hole structure to implement signal connection.

4. The combined phase shifter according to claim 2, wherein the two signal transmission lines are symmetrically distributed on two sides of the power splitter.

5. The combined phase shifter according to claim 1, wherein the phase shifter is a physical phase shifter, the component is a swing arm, and the signal line layer of the phase shifter is attached on a substrate.

6. The combined phase shifter according to claim 5, wherein a quantity of the at least two phase shifters is two, and the signal layers of the two phase shifters are respectively attached on two opposite faces of the substrate.

7. The combined phase shifter according to claim 1, further comprising a housing, wherein a cavity corresponding to each phase shifter is disposed inside the housing, and a substrate configured to carry the signal line layer of the phase shifter inside each cavity is disposed inside the cavity.

8. The combined phase shifter according to claim 7, wherein the substrate is a substrate made of plastic or ceramic.

9. The combined phase shifter according to claim 7, wherein the common output port is connected to an output port of a filter circuit of one of the at least two phase shifters.

10. The combined phase shifter according to claim 9, wherein a partition board is disposed between neighboring cavities, and a through-hole through which the conductor is disposed is provided at the partition board.

11. The combined phase shifter according to claim 10, wherein a slot configured to clasp the phase shifter is disposed inside each cavity.

12. A multi-band antenna network system, comprising a combined phase shifter, wherein the combined phase shifter comprises:
    at least two phase shifters, wherein the at least two phase shifters have different frequency bands, and each phase shifter comprises:
        a signal line layer;
        a phase changing component configured to change a phase of an output port of the signal layer, wherein the phase changing component is slidable relative to the signal line layer; and
        a filter circuit provided at the output port of the signal layer; and
    output ports of filter circuits corresponding to the at least two phase shifters, wherein the output ports of filter circuits are connected by a conductor and provide output by using a common output port.

13. The multi-band antenna network system according to claim 12, wherein the signal line layer comprises:
    an input port;
    a power splitter connected to the input port;
    a first output port connected to the power splitter;
    two signal transmission lines;
    at least one branch transmission line that is connected to each of the two signal transmission lines; and
    a filter circuit that is connected to the at least one branch transmission line.

14. The multi-band antenna network system according to claim 13, wherein the common output port has a U-shaped snap ring or through-hole structure, and the conductor is clasped in the U-shaped snap ring or through-hole structure to implement signal connection.

15. The multi-band antenna network system according to claim 13, wherein the two signal transmission lines are symmetrically distributed on two sides of the power splitter.

16. The multi-band antenna network system according to claim 12, wherein the phase shifter is a physical phase shifter, the component is a swing arm, and the signal line layer of the phase shifter is attached on a substrate.

17. The multi-band antenna network system according to claim 16, wherein a quantity of the at least two phase shifters is two, and the signal layers of the two phase shifters are respectively attached on two opposite faces of the substrate.

18. The multi-band antenna network system according to claim 12, wherein the combined phase shifter comprises a housing, wherein a cavity corresponding to each phase shifter is disposed inside the housing, and a substrate configured to carry the signal line layer of the phase shifter inside each cavity is disposed inside the cavity.

19. The multi-band antenna network system according to claim 18, wherein the substrate is a substrate made of plastic or ceramic.

20. The multi-band antenna network system according to claim 19, wherein the common output port is connected to an output port of a filter circuit of one of the at least two phase shifters.

* * * * *